Figure 1:
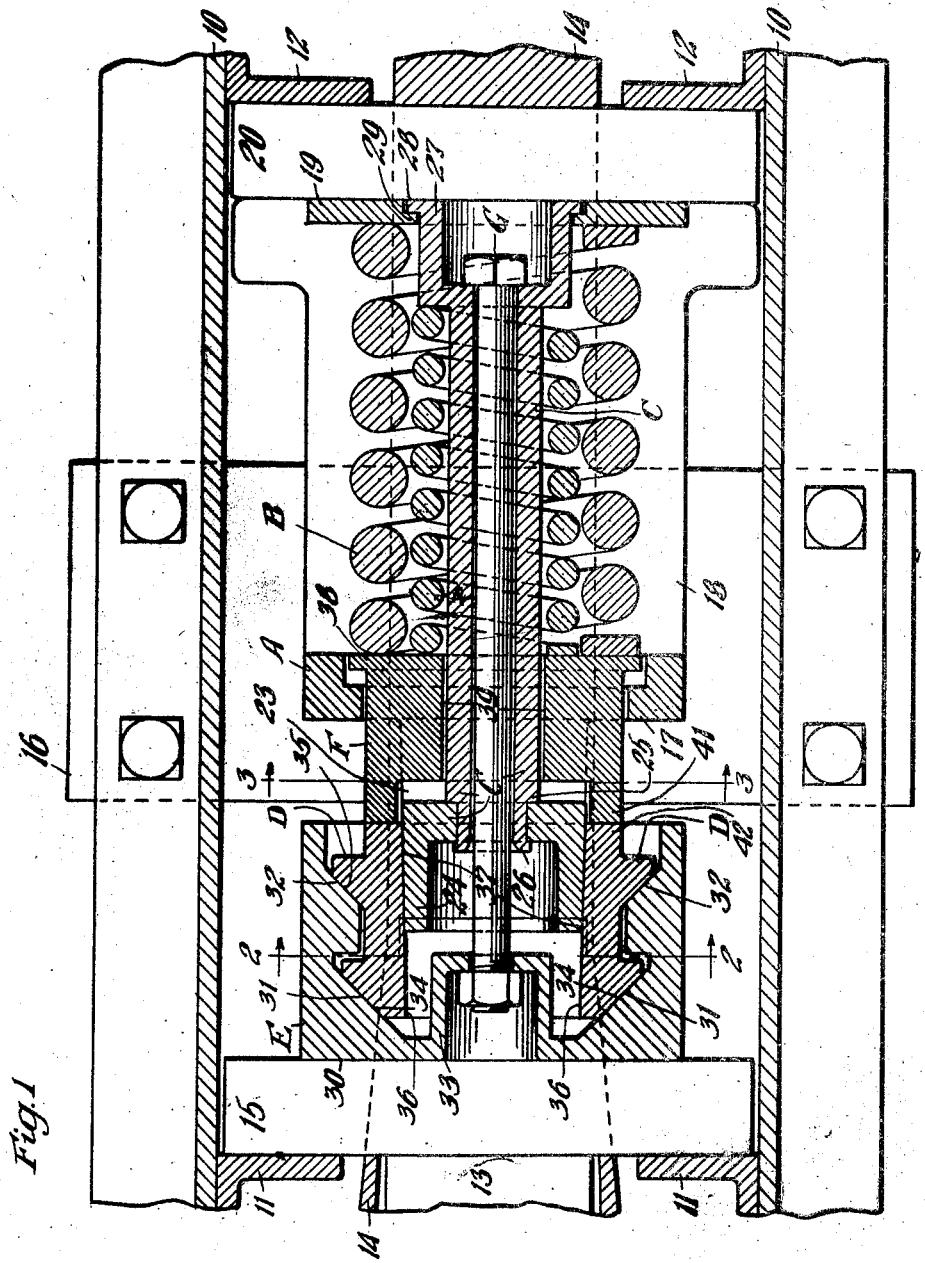

Sept. 29, 1925.  
J. F. O'CONNOR  
1,555,698  
FRICTION SHOCK ABSORBING MECHANISM  
Filed Dec. 22, 1922  
2 Sheets-Sheet 1

Witness  
Wm. Geiger

Inventor  
John F. O'Connor  
By Geo. I. Haight  
his Atty.

Sept. 29, 1925.  
J. F. O'CONNOR  
FRICTION SHOCK ABSORBING MECHANISM  
Filed Dec. 22, 1922   2 Sheets-Sheet 2
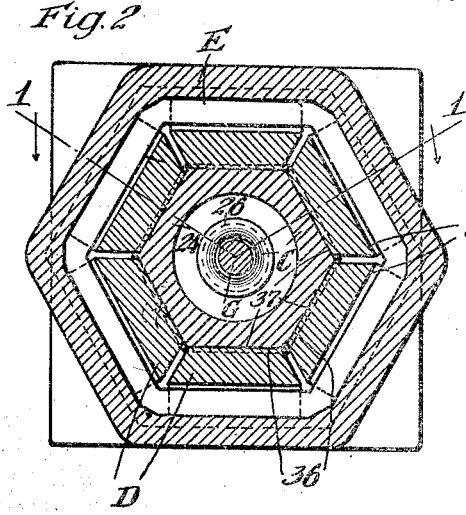
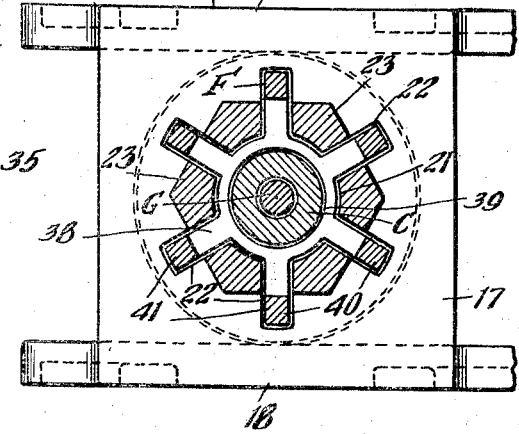
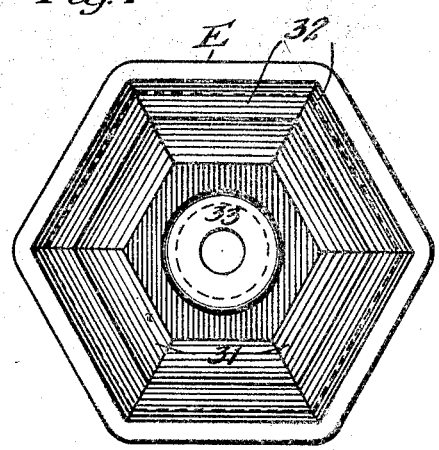
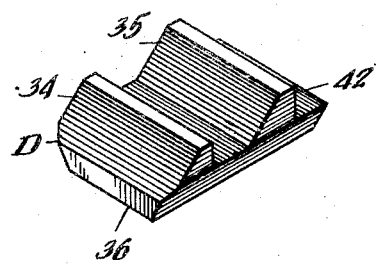
Witness  
Wm. Geiger
Inventor  
John F. O'Connor  
By Geo. I. Haight  
his Atty Patented Sept. 29, 1925.

1,555,698

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 22, 1922. Serial No. 608,393.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

An object of the invention is to provide a friction shock absorbing mechanism especially adapted for railway draft riggings wherein are obtained high capacity combined with easy release, and more especially an arrangement of the friction gripping plunger type so designed as to provide high column strength for absorbing the ultimate loads.

Other objects of the invention will more clearly appear from the description and claims hereinafter following.

In the drawings forming a part of this specification, Figure 1 is a longitudinal sectional view of a portion of a railway draft rigging showing my improvements in connection therewith, the section being taken on the line 1—1 of Figure 2 and corresponding to two intersecting planes at 120° apart. Figures 2 and 3 are vertical transverse sectional views of the shock absorbing mechanism proper corresponding to the lines 2—2 and 3—3 respectively of Figure 1. Figure 4 is an elevational view looking toward the interior of the wedge-pressure-transmitting member, with all other parts removed. And Figure 5 is a detail perspective of one of the wedge gripping elements.

In said drawings, 10—10 denote channel draft sills of a car underframe to the inner faces of which are secured front stop lugs 11 and rear stop lugs 12. A portion of a drawbar is indicated at 13, the same being operatively associated with the shock absorbing mechanism proper by a hooded cast yoke 14 within which is disposed the shock absorbing mechanism and a front follower 15. The yoke and parts therewithin are supported in operative position by a detachable saddle plate 16.

The improved shock absorbing mechanism proper, as shown, comprises, broadly, a combined spring cage and column member A; a spring resistance B; a friction post C; a plurality of friction gripping elements D—D; a combined pressure-transmitting wedge E; a spring follower F; and a retainer bolt G.

The combined spring cage and column member A is in the form of a casting having a front transverse wall 17, top and bottom horizontal walls 18—18 and inner vertical integral wall 19. The rear end of the casting A bears upon a separate rear follower 20, the latter cooperating with the lugs 12, in the usual manner. The front wall 17 of the casting A is provided with an irregular opening circular at the center as indicated at 21, with six radial slots 22 extending therefrom. Integral with said front wall 17 and extending forwardly therefrom are six uniformly spaced arms 23 which are united at their front ends by an integral friction post 24 of hexagonal cross section. The latter is braced against collapse by means of the post C which is shouldered as indicated at 25 against the rear side of the post 24 and riveted over the interior of the latter, as indicated at 26. The post or column C has an integral hollow cup-shaped boss 27 at its inner end, the latter being flanged as indicated at 28 to engage under a corresponding flange 29 on the wall 19 of the casting A. The inner end of the column C will obviously bear upon the follower 20 and thus provide adequate column strength for the friction post proper 24.

The pressure-transmitting wedge member E is of hexagonal outline, as best shown in Figures 2 and 4, the same having a front flat face 30 which bears against the front follower 15. On its interior, the member E is provided with six sets of rearwardly diverging wedge faces 31 and 32 symmetrically arranged with respect to the axis of the mechanism, the wedge faces 31 and 32 of each set being longitudinally spaced, as clearly shown in Figure 1. The member E also has an inwardly extended hollow cup-shaped boss 33 within which is anchored the front end of the retainer bolt G, the inner end of the latter being anchored within the boss 27, heretofore referred to.

The shoes D, six in number, are of like construction, each being provided on its outer side with a pair of longitudinally separated wedge faces 34 and 35 cooperable with a corresponding set of wedge faces 31 and 32 on the member E. On its side nearest the axis of the mechanism, each member D is provided with a longitudinally extending flat friction surface 36 which cooperates with the corresponding flat friction surface 37 of the friction post proper 24. The cooperating sets of friction faces 36 and 37 diverge inwardly of the mechanism, as clearly shown in Figure 1.

The follower F has a central circular section 38 upon which bears the front end of the two-coil spring resistance B. The circular section 38 of the follower is centrally apertured as indicated at 39 to adapt it to slide with respect to the column or post C. Forwardly of the circular section 38, the follower F is provided with six arms 40 which project through radial recesses 22 of the casting A, said arms 40 having finger-like extensions 41—41 at their front ends which engage the inner ends 42 of the respective friction shoes or gripping elements D.

The operation of the mechanism, assuming a compression stroke under buff, is as follows. As the front follower 15 moves inwardly, the wedge member E is forced to travel longitudinally in unison therewith. This movement of the member E in turn forces the friction shoes or gripping elements D in the same direction with a wedge action set up upon the cooperating sets of faces 31—34 and 32—35. The shoes D are yieldingly resisted by the spring resistance B through the intermediary of the follower F. As the member E and shoes D travel inwardly, friction is generated between the shoes D and the friction post 24 and there will be a gradual differential action on the shoes D as the latter travel lengthwise of the tapered friction post proper 24. This differential action is accommodated by leaving an initial clearance between the sides of the shoes D and the side walls of the member E, as shown in Figure 1. The end of the compression stroke is determined by the member E coming into engagement with the casting A and also by the member E coming into engagement with the front end of the friction post, it being observed that the latter is suitably recessed to accommodate the cup-shaped boss 33 therewithin. Upon discontinuance of the actuating force, the spring B will react through the follower F to project the shoes D and member E forwardly, the release being facilitated by reason of the relatively blunt angle of the wedge faces which may be employed and by reason of the outward taper of the cooperating sets of friction surfaces 36 and 37.

From the preceding description, it will be seen that I have provided a mechanism which is self-contained and may be shipped as an assembled unit; that an automatic compensation for wear is provided for, inasmuch as the shoes D and follower F may gradually work forwardly; that adequate housings for the spring and friction creating parts are provided; and that the entire arrangement gives the desired ultimate column strength for absorbing the excessive blows.

I have herein shown and described what I now consider the preferred manner of carrying out my invention, but the same is merely illustrative and I contemplate all such changes and modifications as come within the scope of the claims appended hereto.

I claim:

1. In a friction shock absorbing mechanism, the combination with a spring cage having a transverse outer end wall; of a spring resistance within said cage; a friction post exterior to the cage; means between said post and cage for rigidly connecting the same; a bracing column between said post and the end wall of the cage; friction shoes cooperable with said post; pressure transmitting means cooperable with the shoes and having wedging engagement with the latter; and means for transferring the resistance of said springs to said shoes.

2. In a friction shock absorbing mechanism, the combination with a spring cage; of a series of spaced arms on said cage; a spring resistance within the cage; a friction post disposed exteriorly of the cage, said post being fixed to said spaced arms; wedge friction gripping means cooperable with said post and disposed exteriorly of said cage; and means for transferring the resistance of said spring to said wedge friction gripping means.

3. In a friction shock absorbing mechanism, the combination with a spring cage proper and a friction post integrally formed therewith and projecting from one end thereof, said post having longitudinal friction surfaces angularly disposed with reference to each other; a spring resistance within the cage proper; a column member cooperable with said friction post proper; a plurality of friction shoes surrounding said post, each cooperable with one of the friction surfaces of said post; pressure-transmitting and wedging means cooperable with the outer sides of said shoes; and means interposed between said spring resistance and said shoes arranged to afford a yielding resistance to movement of the latter relatively to the post and cage.

4. In a friction shock absorbing mechanism, the combination with a spring cage proper having a tapered friction post projecting from one end thereof, said end of the cage being apertured; a spring resistance within the cage proper; a column member extending between said post and the opposite end of the spring cage; friction shoes cooperable with said post; pressure-transmitting wedging means cooperable with the shoes; and a spring follower at the end of said spring resistance nearest the friction post, said follower having portions thereof projecting through said opening in the end wall of the cage proper, said portions engaging the adjacent ends of the friction shoes.

5. In a friction shock absorbing mechanism, the combination with a spring cage casting adapted to function also as a column-load-sustaining member, said casting having a tapered friction post integrally formed therewith and projecting from one end of the cage proper; a spring resistance within the cage; a plurality of friction shoes cooperable with said post; a hollow pressure-transmitting member surrounding said shoes and having wedge faces on the interior thereof cooperable with corresponding wedge faces of the shoes, said member being adapted to engage the casting to limit the compression stroke; and a spring follower mounted within said cage proper and having portions thereof projecting outwardly to engage the adjacent ends of the friction shoes.

In witness that I claim the foregoing I have hereunto subscribed my name this 31st day of Oct. 1922.

JOHN F. O'CONNOR.